United States Patent Office 3,647,872
Patented Mar. 7, 1972

3,647,872
PREPARATION OF UREA IN COMBINATION WITH THE SYNTHESIS OF AMMONIA
Petrus J. C. Kaasenbrood, Sittard, and Gerardus J. J. M. Taks, Geleen, Netherlands, assignors to Stamicarbon N.V., Heerlen, Netherlands
Filed Dec. 23, 1968, Ser. No. 785,969
Cliams priority, application Netherlands, Dec. 21, 1967, 6717524
Int. Cl. C07c 127/00
U.S. Cl. 260—555 A
7 Claims

ABSTRACT OF THE DISCLOSURE

A process for the manufacture of urea from ammonia and carbon dioxide is described wherein a technique for reducing the amount of inert gases supplied to urea reactor is utilized. This technique involves first absorbing the ammonia from the ammonia synthesis gas mixture (containing ammonia, hydrogen and nitrogen) in a suitable solvent (water, or an aqueous solution in which ammonia is readily absorbed), and thereafter desorbing the ammonia content of the absorbent solution in a suitable gas stream, the desorption being conducted in such a way that the ammonia content of the desorbed gas mixture is maintained sufficiently high that a relatively much smaller volume of inert gases are thereby introduced into the urea synthesis reactor.

---

Figure 1:
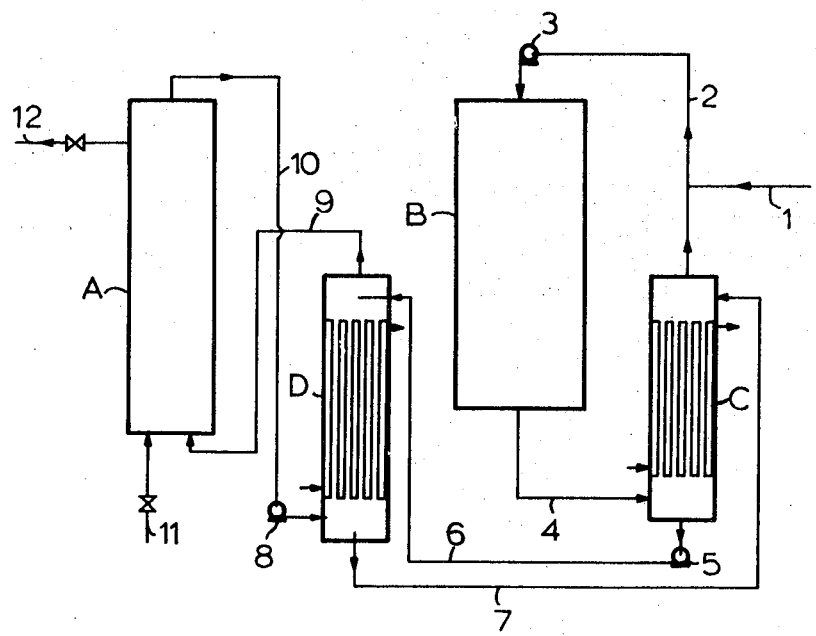

This invention relates to an improved process for the preparation of urea which is incorporated in an ammonia-synthesis process.

As early as 1924, Casale described a process of this type consisting in that the gas mixture from the ammonia-synthesis unit typically containing about 20% by volume of $NH_3$, the remainder being non-converted $H_2$ and $N_2$, under the prevailing temperature and pressure, is introduced into a urea-synthesis zone together with carbon dioxide to form the urea-synthesis solution or melt. Thereafter, the remaining gas mixture with addition of fresh-nitrogen-hydrogen mixture is fed back to the ammonia-synthesis unit.

The said process has the disadvantage that a large column of inert gases is present in the urea-synthesis zone, as a result of which a larger reactor volume is required per ton of urea produced. Moreover a higher total synthesis pressure is required in order to attain a sufficiently high reaction temperature, the magnitude of which is dependent upon the partial pressure of the $NH_3$ and $CO_2$ reaction components in the gas mixture entering the urea-synthesis zone.

Owing to the above-mentioned disadvantages, this process is not very attractive from a practical and economical point of view. While it is true that it is possible to lower the inert gas volume introduced into the urea-synthesis zone by first liquefying the ammonia gas and thereby separating out the hydrogen and nitrogen content thereof, such a technique not only results in heat losses in the cooling-out of $NH_3$ from the gases from the ammonia-synthesis unit, input calories being carried off by the cooling water employed. Further, energy is required for the refrigerating machinery required to lower the temperature of the gases to about $-10$ to $-20°$ C. for effecting such liquefication.

According to the present invention, it has now been found that these disadvantages can be overcome by absorbing the $NH_3$ from the $NH_3$, $H_2$ and $N_2$ gas mixture from the ammonia-synthesis unit in a counter-current flow of a solvent, as described hereinafter; and thereafter subsequently desorbing the $NH_3$ from the $NH_3$-loaded solvent in a counter-current gas flow, using a temperature therein exceeding the final temperature in the said absorption treatment and with such a gas volume that the product of the molar $NH_3$-fraction and the total pressure in the resulting $NH_3$-loaded gas flow amounts to at least 100 atm.; and, finally, feeding the $NH_3$-loaded gas to the urea-synthesis zone. If the $NH_3$-desorption process is effected at a temperature exceeding the final temperature used in the $NH_3$-absorption process, the volume of desorption gas required in the former process will be considerably smaller than the volume of gas from which the $NH_3$ has been absorbed.

As a result, the volume of the inert gases present in the urea-synthesis zone may also be made considerably smaller than in the case where the gases from the $NH_3$-synthesis unit are passed directly to the urea-synthesis zone. The desorption-absorption process furthermore requires fewer calories of energy input than the cooling-out of $NH_3$ from the $NH_3$-synthesis gases. The advantages aimed at by the present invention, e.g., relatively small reactor capacity and moderate synthesis pressure, can then be realized if the partial vapor pressure of the ammonia present in the $NH_3$-containing gas mixture to be supplied to the urea-synthesis zone is sufficiently high. As no accurate specific limits can be given for this pressure, the scope of the practice of this invention is most accurately defined by prescribing the use of a volume of the desorption gas of such a value that after the desorption the product of the molar $NH_3$-fraction and the total pressure in the gas volume will be at least 100 atm.

Suitable solvents for dissolving the gaseous ammonia in the practical application of the invention include: water itself, aqueous solutions of salts in which ammonia can be readily dissolved such as ammonium nitrate, urea solutions and even urea melts—by which are to be understood evaporated urea solutions having a urea concentration of 95% by weight or over.

In principle, the $NH_3$-desorption gas may be any gas which does not react with urea under the reaction conditions, such as, for instance, air, carbon dioxide, nitrogen, hydrogen, or a mixture of carbon dioxide, nitrogen and hydrogen.

In the process according to the invention, some inert gas is, of course, still present in the urea-synthesis zone along with the $NH_3$ and $CO_2$ gases. Therefore, the total synthesis pressure will still have to be sufficiently high, e.g., 250 atmospheres or higher, at the customary $NH_3/CO_2$-ratios of, e.g., 2:1 to 6:1, as otherwise the temperature will remain too low and the reaction would then proceed too slowly. In this respect, practice of the process of the present invention uses conventional urea synthesis processes and temperatures.

If a urea melt obtained by evaporation is used for absorbing the gaseous $NH_3$ from the gas flow from the ammonia-synthesis zone, the amount of ammonia absorbed into the urea melt can be advantageously used in a simple way for lowering the undesirable biuret content of the urea melt.

Thus, if the temperature of the $NH_3$-loaded urea melt is maintained at above about 130° C., a considerable portion of the biuret contaminant, which is always present in urea solutions that have been concentrated to the urea melt, will be converted again into urea within a relatively short time, e.g., within about 10 to 60 minutes, depending on the temperature, according to the reaction equation:

In this way, a biuret content with amounts to, e.g., 0.9% by weight prior to the absorption, can be reduced to such an extent that it amounts to only about e.g., 0.35% by weight, or at least to less than 0.5% by weight in the urea melt which is free of $NH_3$ after the desorption.

The principle underlying the process of this invention will now be elucidated with reference to FIG. 1 of the attached drawings, wherein there is shown a urea-synthesis reactor A, an ammonia-synthesis reactor B, an absorption column C and a desorption column D, in diagrammatic outline. The absorption column and the desorption column are of the tubular type, in which the absorbent flows down a bunch of tubes, while it is heated or cooled by steam or water supplied around the tubes, resectively.

Fresh ammonia-synthesis gas which is at the synthesis pressure, is supplied to the ammonia-synthesis column via conduit 1, conduit 2 and by-pass pump 3. The gases from the said synthesis reactor which contain 15 to 20% by volume of $NH_3$ are passed via conduit 4, to absorption column C, where the gas mixture is brought into contact with a countercurrent flow of absorbent which is circulated through the said absorption column via circulation pump 5, conduit 6, desorption column D and conduit 7, the said absorbent taking up the $NH_3$. The synthesis gas freed from $NH_3$ then flows, via conduit 2 and pump 3, back again to ammonia-synthesis reactor B together with freshly supplied synthesis gas. The $NH_3$-loaded absorption solution is at a temperature of e.g. 20° C. above the temperature which the solution leaves absorption column C, and is then subjected to a desorption treatment with the aid of a desorption gas which is circulated through circulation pump 8 via column D, conduit 9, urea-synthesis reactor A and conduit 10. The urea-synthesis reactor is furthermore supplied with $CO_2$ via conduit 11, which $CO_2$ has previously been compressed to the synthesis pressure, and the urea-synthesis solution formed in the reaction is discharged via conduit 12.

Figure 2:
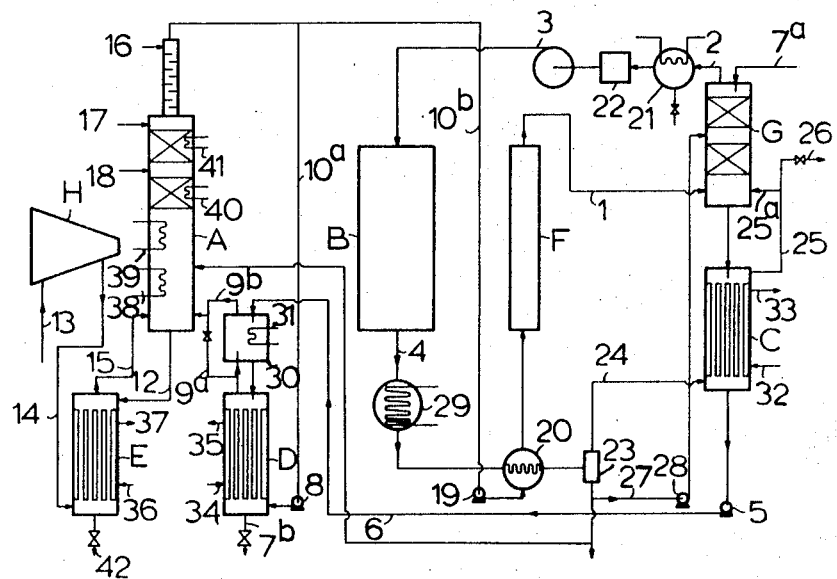

In the process according to the invention, the absorption liquid may be continuously supplied to the absorption column and be discharged via the desorption column, instead of being circulated in the way indicated in FIG. 1. This will in practice be the case, if e.g. the urea melt produced in the urea plant is used as the absorption liquid. It is also unnecessary to circulate the gas flow used in the desorption treatment. Instead, this gas flow may be formed, e.g., by the synthesis gas to be used in the $NH_3$-synthesis reaction, which is first used in that case as desorption gas and subsequently, if so desired, is made to give up the ammonia in the urea-synthesis reactor, at least partly, after which the gases discharged from the said reactor are passed to the ammonia-synthesis reactor. A process of this type is schematically represented in FIG. 2. The reference letters and numbers employed in FIG. 1 have been used in FIG. 2 for corresponding components of the process unit.

In the process according to FIG. 2, synthesis gas supplied via 13 e.g., a mixture of $H_2$, $N_2$ and $CO_2$ obtained by conversion of methane, is compressed to the synthesis pressure by compressor H and subsequently, passed to urea synthesis reactor A via conduit 14, stripping column E and conduit 15. In reactor A the $CO_2$ present in the gas flow reacts with the $NH_3$ supplied through conduits 9a and 9b to form ammonium carbamate and urea. To remove the unreacted $NH_3$, the gas flow if washed with water, supplied through conduit 16, and ammonium carbamate solutions, supplied via conduits 17 and 18, the same having been obtained in the processing and evaporation of the urea-synthesis solution.

The ammonia-synthesis gas thus obtained, which has been virtually completely freed from $CO_2$ and $NH_3$, is split into 2 streams, one portion being fed to the base of desorption column D via conduit 10a and pump 8, while the remainder is passed to CO-convertor F via conduit 10b, pump 19 and heat exchanger 20, wherein the gas flow is heated to, e.g., 130° C. by the hot gas flow discharged from the ammonia-synthesis column. In convertor F the CO present as a contaminant in the synthesis gas is oxidized to carbon dioxide. The synthesis gas then flows via conduit 1 to washing column G, where the $CO_2$ formed is removed with the aid of $NH_3$ supplied via conduit 27, and, subsequently, into ammonia-synthesis reactor B, via conduit 2 and by-pass pump 3 after it has previously, been freed from the last traces of water, $NH_3$ and carbon dioxide my means of condenser 21 and molecular sieves 22.

The gas flow discharged from the ammonia-synthesis column via conduit 4, and which now contains $NH_3$ and at a temperature of about 430° C., is delivered via steam generator 29 (wherein the gas temperature is lowered to, e.g., about 160° C.) and heat exchanger 20 (wherein the said temperature further decreases to, e.g., about 80° C. and part of the $NH_3$ condenses). The condensed part of the $NH_3$ is separated from the gas flow in gas-liquid separator 23 and, if so desired, partly supplied to washing column G via conduit 27 and pump 28, while the remaining portion is discharged to the urea-synthesis autoclave or, if so desired, carried off as liquid ammonia product. The gas flow is supplied to conduit 24, via which it is, according to the invention, brought into contact with a solvent for $NH_3$, viz. a urea melt supplied via conduit 7a. This latter urea melt first passes through washing column G to serve as washing liquid and subsequently flows into the tops of the tubes of absorption column G.

In the said tubes, the $NH_3$ contained in the gas mixture supplied via conduit 24 is absorbed by the downward, counter-current flow of urea melt; the absorption heat released in the said treatment converts the water supplied through conduit 32 and flowing around the above-mentioned tubes into steam, which leaves absorption column C via conduit 33. The gas which has been largely freed from $NH_3$, is then fed via conduits 25 and 25a into the base of washing column G, wherein the $NH_3$ still left is removed from it, and subsequently returned to ammonia-synthesis reactor B via conduit 2 and by-pass pump 3.

To prevent inert gases, such as argon, from accumulating in the circulated gas flowing through ammonia-synthesis reactor B, part of the gas flow is vented in the customary way via blow-down pipe 26.

Prior to the desorption, the $NH_3$-loaded urea melt is first fed into the biuret-removing reactor 30 via pump 5 and conduit 6, which reactor is located over desorption column D. If so desired, ammonia-containing gas flowing out of desorber D may be passed through the urea melt present in reactor 30; and the amount passed therethrough can be controlled by means of the valve fitted in conduit 9a. The temperature in reactor 30 can be controlled by means of heat-exchange spiral 31.

Reactor 30 is so dimensioned that in the case of a continuous supply and discharge, the residence time of the ammonia-loaded urea melt will, e.g. be 10 to 60 minutes. The biuret content of the urea melt is thereby lowered in reactor 30 and said melt is passed to desorption column D, where it is treated with the amount of desorption gas supplied via conduit 10a and pump 8. The ammonia-loaded desorption gas flows into the base of urea-synthesis reactor A via conduit 9a and, if so desired, also via reactor 30 and conduit 9b.

The urea melt thus freed from ammonia is discharged from the base of desorption column D via conduit 7b to be converted into solid urea in the customary way, e.g., by prilling or by passing it through a crystallizing screw. The heat required in the $NH_3$-desorption is supplied by feeding steam to the desorption column via conduit 34, the condensed steam being discharged via conduit 35. The urea synthesis solution formed in urea-synthesis reactor A is fed via conduit 12 into the top of stripping column E to be brought into contact with a counter-current flow of synthesis gas supplied via conduit 14, as a result of which, as is known in the art, a large portion, e.g. 80 to 90%, of the ammonium carbamate present in the urea-synthesis solution is removed therefrom in the form of $NH_3$ and $CO_2$. The heat required is supplied in the form of steam via conduit 36, the condensed steam being discharged via conduit 37.

In synthesis gas containing $NH_3$ and $CO_2$ flows into the base of urea-synthesis column A via conduit 15. The heat produced in the said column, mostly with simultaneous formation of steam, is carried off by means of cooling spirals 38, 39, 40 and 41, which are at different temperature levels.

The urea solution produced is then discharged from the base of the stripping column via conduit 42; and after being expanded, this solution is, in the customary way, further freed from ammonium carbamate which has not been converted into urea, and subsequently evaporated to a urea melt. The melt thus obtained after first having been brought to the synthesis pressure is then supplied again to absorber C via conduit 7a and washing column G to serve as absorption agent.

The invention of this application may, of course, be practiced under conditions other than those specifically discussed hereinabove. For instance, the absorption step may be carried out at pressures conveniently in the range of 200 to 500 atm. and temperatures between about 50 to 150° C. When a salt or urea solution is used, the concentration of said salt or urea in the solution may be between about 50 to 100% by weight. In the desorption step, the pressure employed may be conveniently within the range of 200 to 500 atm. and at a temperature of about 100 to 200° C. The ammonia-coated desorption gas stream can conveniently be obtained under this process having an ammonia concentration of between about 25 to 75 mol. percent.

We claim:
1. In a process for the preparation of urea by reacting ammonia and carbon dioxide at elevated temperatures and pressures in combination with an ammonia synthesis process wherein the ammonia formed in said ammonia synthesis unit is supplied to the urea synthesis unit for reaction with carbon dioxide also supplied thereto, the improvement consisting essentially in lowering the inert gas content of the ammonia stream obtained from the ammonia synthesis unit by the combination of steps of:

(1) washing the gas flow from the ammonia synthesis unit containing ammonia, hydrogen and nitrogen, in a counter current flow of an absorbent capable of absorbing gaseous ammonia and selected from the group consisting of (a) water, (b) aqueous solutions of ammonium nitrate (c) aqueous solution of urea and ammonia nitrate, (d) aqueous solutions of urea, and (e) a urea melt, and at a temperature in the range of about 50° C. to 150° C. and under a pressure in the range of about 200 to 500 atm., whereby the ammonia in said gas flow is absorbed in said water, aqueous solution or melt; and (2) desorbing the ammonia from the resulting aqueous ammonia solution or melt, at a temperature higher than that used in said absorption and within the range of about 100° C. to 200° C., and under a pressure in the range of about 200 to 500 atm., by passing therethrough a counter-current flow of a gas, which gas is inert with respect to urea under the conditions prevailing in the urea synthesis unit, at a rate and volume of said gas such that the product of molar ammonia fraction in the desorbed gas stream and the total pressure of said gas stream amounts to at least 100 atm. and (3) feeding the said desorption gas stream into the urea synthesis unit, while (4) recycling the gas mixture freed from the ammonia in the absorption step back to the said ammonia synthesis unit.

2. The process of claim 1 wherein the said absorbent for the ammonia is circulated between the ammonia absorption step and the ammonia desorption step.

3. The process of claim 1 wherein the absorbent for the ammonia is a urea melt having a concentration of at least 95% by weight.

4. The process of claim 3 wherein, after absorption of said ammonia, said urea melt is maintained at a temperature of at least 130° C. for sufficient time that its biuret content is reduced to a level below about 0.5% by weight, prior to being subjected to the desorption treatment.

5. The process of claim 1 wherein the desorbing gas used in the desorption treatment is the synthesis gas fed to the ammonia-synthesis unit.

6. The process of claim 5 wherein said synthesis gas is pasesd through the urea synthesis unit prior to being used as the desorption gas to remove any carbon dioxide content thereof by reaction to form ammonia carbamate or urea therefrom.

7. The process of claim 6 wherein the said synthesis gas is first brought into contact with the solution containing urea and ammonia carbamate produced in the urea synthesis unit, serving as a stripping gas therefor, prior to its being introduced into the urea synthesis unit.

References Cited

FOREIGN PATENTS 1,487,249   5/1967   France _____ 260—555

LEON ZITVER, Primary Examiner

M. W. GLYNN, Assistant Examiner

U.S. Cl. X.R.

23—199; 55—70